(12) United States Patent
Jang et al.

(10) Patent No.: US 6,908,975 B2
(45) Date of Patent: Jun. 21, 2005

(54) METHOD FOR PREPARING HIGH 1,4-CIS POLYBUTADIENE HAVING CONTROLLED COLD FLOW

(75) Inventors: Young Chan Jang, Daejeon (KR); Pil Sung Kim, Daejeon (KR); Shin Han, Daejeon (KR); Gwang Hoon Kwag, Daejeon (KR); Seung Hwon Lee, Daejeon (KR)

(73) Assignee: KoreaKumho Petrochemical Co., Ltd. (KR)

( * ) Notice: Subject to any disclaimer, the term of this patent is extended or adjusted under 35 U.S.C. 154(b) by 97 days.

(21) Appl. No.: 10/653,542

(22) Filed: Sep. 2, 2003

(65) Prior Publication Data
US 2004/0102589 A1 May 27, 2004

(30) Foreign Application Priority Data
Nov. 22, 2002 (KR) ................. 10-2002-0072934

(51) Int. Cl.$^7$ ............................................. C08F 136/06
(52) U.S. Cl. .................... 526/340.4; 526/132; 526/164; 526/335
(58) Field of Search ............................... 526/132, 164, 526/335, 340.4

(56) References Cited

U.S. PATENT DOCUMENTS

| | | | |
|---|---|---|---|
| 3,346,549 A | 10/1967 | Ford et al. | |
| 4,204,969 A | 5/1980 | Papay et al. | |
| 4,699,962 A | 10/1987 | Hsieh et al. | |
| 4,906,706 A | 3/1990 | Hattori et al. | |
| 5,017,539 A | 5/1991 | Jenkins et al. | |
| 5,064,910 A | 11/1991 | Hattori et al. | |
| 5,428,119 A | * 6/1995 | Knauf et al. | ............... 526/153 |
| 5,567,784 A | 10/1996 | Wieder et al. | |
| 5,686,371 A | 11/1997 | Ansell et al. | |
| 6,136,931 A | * 10/2000 | Jang et al. | ............... 526/133 |

FOREIGN PATENT DOCUMENTS

| | | |
|---|---|---|
| EP | 0 127 236 | 7/1987 |
| EP | 0 375 421 | 6/1990 |
| EP | 0 386 808 | 11/1993 |

* cited by examiner

Primary Examiner—Roberto Rabago
(74) Attorney, Agent, or Firm—Dilworth & Barrese LLP

(57) ABSTRACT

The present invention relates to a method for preparing a high 1,4-cis polybutadiene having a controlled cold flow and, more particularly, to a novel method for preparing a high 1,4-cis polybutadiene having a controlled cold flow that involves initiating polymerization of a 1,3-butadiene in the presence of a non-polar solvent using, as a polymerization catalyst, a complex prepared by mixing a neodymium compound with or without a conjugated diene compound, a halogenated organoaluminum compound or a halogenated organic compound, and an organoaluminum compound irrespective of the addition order of the catalyst; and adding an organoborane compound as a cold flow controller of 1,4-cis polybutadiene after a predetermined time of the polymerization. Accordingly, a high 1,4-cis polybutadiene having an efficiently controlled cold flow can be prepared without causing a significant increase in the Mooney viscosity (molecular weight), an odor (bad smell), and a reduction in 1,4-cis content and polymerization yield.

14 Claims, No Drawings

METHOD FOR PREPARING HIGH 1,4-CIS POLYBUTADIENE HAVING CONTROLLED COLD FLOW

CROSS REFERENCE TO RELATED APPLICATIONS

This application claims priority to Korean Patent Application No. 10-2002-0072934 filed Nov. 22, 2002 under 35 USC § 119.

BACKGROUND OF THE INVENTION

1. The Field of the Invention

This invention relates to a method for preparing a high 1,4-cis polybutadiene having a controlled cold flow. More specifically, this invention relates to a novel method for preparing a high 1,4-cis polybutadiene having a controlled cold flow that involves initiating a polymerization of 1,3-butadiene using, as a catalyst, a complex comprising a neodymium compound, a halogenated organoaluminum compound or a halogenated organic compound, and an organoaluminum compound, and then adding an organoborane compound to the reaction system after a predetermined time period, thereby efficiently controlling the cold flow of high 1,4-cis polybutadiene.

2. Related Prior Art

The high 1,4-cis polybutadiene prepared in the presence of a neodymium catalyst, as a major catalyst, that is one of rare earth metal salts (i.e., metal salts from lanthanum (57) to lutetium (71)) exhibits more excellent properties such as high 1,4-cis content, high molecular weight, and narrow molecular weight distribution, compared with the high 1,4-cis polybutadiene prepared in the presence of a transition metal salt (e.g., nickel, titanium or cobalt salt) as a major catalyst. However, such a high 1,4-cis polybutadiene results in a high cold flow due to its molecular structure having a high linearity, causing poor storability, workability and processability.

The cold flow of high 1,4-cis polybutadiene is of a great importance in relation to storability, workability and processability of the product. An excessively high cold flow may function as a factor in the serious deterioration of storability (i.e., causing the product to flow out of the packing material and contaminating the product with various impurities to deteriorate the properties of the product), workability (i.e., causing the product to flow out of the packing material and adhere to the same product of another packing material, thereby changing the weight of the product packed according to a standard and causing a need for unpacking and reweighing the product to reduce the productivity), and processability. Thus when the product is packed in a defined standard, the ability of the product to maintain the original packed shape for a predetermined time period regardless of weight, pressure and elapsed time is one of the very important properties to those manufacturers that produce other products using the high 1,4-cis polybutadiene.

Many conventional polybutadiene preparation methods using a rare earth metal salt such as neodymium as a catalyst have been reported as follows. U.S. Pat. No. 5,686,371 discloses a preparation method of high 1,4-cis polybutadiene using, as a catalyst, a complex prepared by aging a mixture of a neodymium salt compound, a silicon halide compound, an organoaluminum compound, and a diene compound. U.S. Pat. No. 4,699,962 discloses a preparation method of high 1,4-cis polybutadiene using, as a catalyst, a complex prepared by mixing a neodymium hydride compound, a chlorine-containing compound, an electron-donor ligand, and an organoaluminum compound. European Patent No. 127,236 discloses a 1,3-butadiene polymerization method using, as a catalyst, a complex prepared by mixing a neodymium compound, an organohalide compound, an organic compound containing a hydroxyl group, and an organoaluminum compound. European Patent No. 375,421 and U.S. Pat. No. 5,017,539 disclose a preparation method of high 1,4-cis polybutadiene using, as a catalyst, a complex prepared by aging a mixture of a neodymium compound, an organohalide compound, and an organoaluminum compound at a temperature of below 0° C.

In addition, U.S. Pat. No. 5,567,784 discloses a preparation method of 1,4-cis polybutadiene that prepares 1,4-cis polybutadiene in the presence of a non-polar solvent using, as a catalyst, a complex comprising a neodymium carboxylate compound, an alkyl aluminum compound, and a halogen-containing compound, and then adds sulfur chloride to lower the cold flow, thereby improving the processability. This method involves adding sulfur chloride after removal of non-reacted 1,3-butadiene so as to diminish the smell of the added sulfur chloride, but has the difficulty in eliminating completely the odor of sulfur chloride.

European Patent No. 0 386 808 A1 discloses a preparation method of 1,4-cis polybutadiene that involves preparing a 1,4-cis polybutadiene in the presence of a non-polar solvent using a catalyst comprising a neodymium carboxylate compound, an alkylaluminum compound, and a halogen-containing compound, and then adding a phosphorous trichloride ($PCl_3$) to lower cold flow, thus improving processability. But, in this method, the Mooney viscosity of the product greatly increases with an increase in the amount of $PCl_3$.

U.S. Pat. Nos. 4,906,706 and 5,064,910 disclose a method that uses, as a catalyst, a complex prepared by mixing a rare earth metal salt compound, a Lewis acid and/or a Lewis base, and an organoaluminum compound with/without a diene compound, and then aging the mixture. The polymerization is performed using the aged catalyst, and isocyanate, carbon disulfide, an epoxy compound, or an organotin halide compound is added to the produced 1,4-cis polybutadiene to deform the structure of 1,4-cis polybutadiene, thereby improving cold flow and properties.

U.S. Pat. Nos. 3,346,549 and 4,204,969 disclose a method that polymerizes an olefin compound using both a halide and a sulfur chloride compounds and uses the resultant polymer as an additive of a lubricant oil to enhance the characteristics of load carrying, extreme pressure, and viscosity index.

However, these conventional approaches provide incidental problems such as the increased Mooney viscosity of the product, an odor (bad smell), and a reduction in both 1,4-cis content and polymerization yield, thus having difficulty in controlling efficiently the cold flow of high 1,4-cis polybutadiene.

SUMMARY OF THE INVENTION

In an attempt to improve the problems with the prior art, the inventors of the present invention have figured out that a high 1,4-cis polybutadiene having a controlled cold flow can be prepared without causing a significant increase in the Mooney viscosity (molecular weight), an odor (bad smell), and a reduction in 1,4-cis content and polymerization yield by initiating the polymerization of butadiene using, as a catalyst, a complex comprising a neodymium compound, a halogenated organoaluminum compound or a halogenated organic compound, and an organoaluminum compound, and adding an organoborane compound after a predetermined time of the polymerization.

It is therefore an object of the present invention to provide a novel method for preparing a high 1,4-cis polybutadiene having a controlled cold flow, which method involves the addition of an organoborane compound in preparing a neodymium-polybutadiene, thereby increasing the degree of branch of high 1,4-cis polybutadiene so as to control efficiently the cold flow of high 1,4-cis polybutadiene.

To achieve the object of the present invention, there is provided a method for preparing a high 1,4-cis polybutadiene that includes: initiating polymerization of a 1,3-butadiene in the presence of a non-polar solvent using a polymerization catalyst prepared by mixing irrespective of the addition order (1) a neodymium compound with or without a small amount of a conjugated diene compound, (2) a halogenated organoaluminum compound or a halogenated organic compound, and (3) an organoaluminum compound; and adding an organoborane compound represented by the following formula 1 or 2 as a cold flow controller of 1,4-cis polybutadiene after a predetermined time of the polymerization:

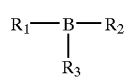

Formula 1 wherein $R_1$, $R_2$ and $R_3$ are the same or different and include an alkyl group having 1 to 5 carbon atoms, respectively,

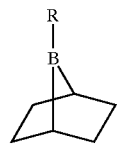

Formula 2 wherein R is an alkoxy or alkyl group having 1 to 5 carbon atoms.

In the present invention, the polymerization of 1,3-butadiene is initiated in the presence of a non-polar solvent using a polymerization catalyst prepared by mixing irrespective of the addition order (1) a neodymium compound with or without a conjugated diene compound, (2) a halogenated organoaluminum compound or a halogenated organic compound, and (3) an organoaluminum compound. The polymerization catalyst as used herein is a known Ziegler-Natta catalyst.

1,3-butadiene is polymerized in the presence of the non-polar solvent by using the Ziegler-Natta catalyst, and then further polymerized by adding an organoborane compound represented by the formula 1 or 2 as a cold flow controller.

Specific examples of the organoborane compound represented by the formula 1 may include at least one selected from the group consisting of trimethylborane, triethylborane, tripropylborane, tributylborane, triisobutylborane, and tripentylborane.

Specific examples of the organoborane compound represented by the formula 2 may include at least one selected from the group consisting of B-methoxy-9-BBN(B-methoxy-9-borabicyclo[3.3.1]nonane) (hereafter, BBN is refered to borabicyclo[3.3.1]nonane), B-ethoxy-9-BBN, B-propanoxy-9-BBN, B-butanoxy-9-BBN, B-isobutanoxy-9-BBN, B-pentoxy-9-BBN, B-methyl-9-BBN, B-ethyl-9-BBN, B-propyl-9-BBN, B-butyl-9-BBN, B-isobutyl-9-BBN, and B-pentyl-9-BBN (BBN=borabicyclo[3.3.1]nonane).

The mol ratio of the organoborane compound to the neodymium compound is a 1:1 to 80:1, preferably 5:1 to 50:1. If the mol ratio of the organoborane compound to the neodymium compound is less than 1, then the effect of controlling the degree of branch of high 1,4-cis polybutadiene is deteriorated to reduce the effect in the control of cold flow. On the other hand, if the mol ratio of the organoborane compound to the neodymium compound exceeds 80, then a discoloration of high 1,4-cis polybutadiene occurs.

The organoborane compound serves to increase the degree of branch (decreasing the linearity) of 1,4-cis polybutadiene and thereby facilitates the control of the cold flow of 1,4-cis polybutadiene. The addition of the organoborane compound as a cold flow controller results in a product having no significant increase in the Mooney viscosity according to the amount of organoborane compound, and hardly cause an odor as in the case of sulfur chloride.

However, the effect in the control of cold flow is reduced when using other organoborane compounds such as $BOEt_3$ or $Et_2BOMe$ than the organoborane compounds represented by the formula 1 or 2.

In the Ziegler-Natta catalyst of the present invention, the neodymium compound (1) is a metal salt comprising an organic or inorganic acid, but an organic acid salt containing a carboxylate group with a high solubility in an organic solvent is preferable. The carboxylate as used herein is a saturated, unsaturated, ring, or linear structure having 6 to 20 carbon atoms. Specific examples of the carboxylate may include octanoic acid, 2-ethyl hexanoic acid, naphthenic acid, versatic acid, and stearic acid.

Specific examples of the neodymium carboxylate containing the carboxylate is selected from the group consisting of neodymium(versatate)$_3$, neodymium(versatic acid)(versatate)$_3$, neodymium(octanoate)$_3$, neodymium(2-ethyl hexanoate)$_3$, neodymium-(naphthenate)$_3$, and neodymium (stearate)$_3$.

The halogenated organoaluminum compound (2) is a compound represented by the formula $AlX_n R^4{}_{3-n}$, where n is 1 to 2; X is Cl or Br; and $R^4$ is the same or different and includes an alkyl group having 1 to 10 carbon atoms. Specific examples of the halogenated organoaluminum compound may include dimethylaluminum chloride, diethylaluminum chloride, dipropylaluminum chloride, dibutylaluminum chloride, and diisobutylaluminum chloride.

Also, the halogenated organic compound (2) may include tert-alkyl halogen, organoboron halogen, organosilyl halogen, organotin halogen, and organotitanium halogen compounds. More specifically, the halogenated organic compounds are tert-butyl chloride and trialkylsilyl chloride.

The mol ratio of the neodymium compound to the halogenated organoaluminum compound or the halogenated organic compound is 1:0.5 to 1:5, preferably 1:1 to 1:3. If the mol ratio of the halogen-containing compound to the neodymium compound is less than 0.5 or greater than 5, then the 1,4-cis content or the polymerization yield is deteriorated.

The organoaluminum compound (3) is a compound represented by the formula $AlR^5{}_3$, where $R^5$ is the same or different and includes hydrogen, or an alkyl group having 1 to 10 carbon atoms. Specific examples of the organoaluminum compound may include trimethylaluminum, triethylaluminum, tripropylaluminum, tributylaluminum, triisobutylaluminum, trihexylaluminum, trioctylaluminum, and diisobutylaluminum hydride.

The mol ratio of the neodymium compound to the organoaluminum compound is 1:20 to 1:80, preferably 1:25 to 1:50. If the mol ratio of the organoaluminum compound to the neodymium compound is less than 20, then the polymerization yield deteriorates. On the other hand, if the mol ratio of the alkylaluminum compound to the neodymium compound exceeds 80, then a discoloration of the high 1,4-cis polybutadiene and a deterioration of the 1,4-cis content could be occurred.

The solvent used for preparing the catalyst is necessarily a non-reactive to the catalyst and may include cyclohexane, hexane, and heptane.

The aged catalyst can be prepared according to the following addition order of the catalyst components: (a) the neodymium compound with or without a 1,3-butadiene added to a catalyst reactor in the nitrogen atmosphere; (b) the halogenated organoaluminum compound or the halogenated organic compound; and (c) the organoaluminum compound.

But, the addition order of the catalyst components is variable according to the process, and the catalyst components can be added directly to the reactor without the aging step. When using 1,3-butadiene in the catalyst-aging step, it is preferable to use one to ten equivalents of 1,3-butadiene to the neodymium catalyst. Preferably, the aging time is 5 minutes to 2 hours, and the aging temperature is −30 to 60° C.

The polymerization solvent is used in the oxygen- and water-free state. Examples of suitable polymerization solvent may include aliphatic hydrocarbons such as, butane, pentane, hexane, isopentane, heptane, octane, and isooctane; cycloaliphatic hydrocarbons such as cyclopentane, methylcyclopentane, cyclohexane, methylcyclohexane, and ethylcyclohexane; and aromatic hydrocarbons such as benzene, toluene, ethylbenzene, and xylene.

The polymerization is performed in the high-purity nitrogen atmosphere, and the polymerization temperature is preferably in the range from −20 to 100° C. Under the appropriate catalyst conditions, three-hour polymerization is preferred with a conversion of more than 90%.

After the polymerization reaction, polyoxyethyleneglycolether organophosphate and 2,6-di-tert-butylparacresol are added as a reaction terminator and an antioxidant, respectively, and then methyl alcohol or ethyl alcohol is added to precipitate the product.

DETAILED DESCRIPTION OF THE INVENTION

Now, the present invention will be described in further detail by way of the following examples, which are not intended to limit the scope of the present invention.

EXAMPLE 1

For a polymerization reaction, nitrogen was sufficiently blown into a 360 ml of pressure reactor. To the reactor containing 150 g of solvent (a mixture of cyclohexane and heptane, 9:1, wt/wt) were sequentially added triisobutylaluminum (1M solution in hexane), diisobutylaluminum hydride (1M solution in hexane), diisobutylaluminum chloride (1.5% solution in cyclohexane), and neodymium (versatic acid)(versatate)$_3$ (1.44% solution in cyclohexane) including 0.02 g of 1,3-butadiene with a mol ratio of 35:5:2:1, respectively.

After the addition of 1,3-butadiene as a monomer, the polymerization reaction was performed at 40° C. for 30 minutes. Then 10 equivalents of triethylborane compound to neodymium(versatic acid)(versatate)$_3$ was added as a cold flow controller, and the polymerization reaction was further performed at the same reaction temperature for 150 minutes. The weight ratio of the polymerization solvent to the monomer was 5, and $1.4\times10^{-4}$ mol of the neodymium catalyst was used per 100 g of the monomer. After the reaction, 2,6-di-tert-butylparacresol, polyoxyethyleneglycol phosphate and ethanol were added to the reaction mixture.

EXAMPLES 2 TO 10

The procedures were performed in the same manner as described in Example 1, excepting for the amount of the triethylborane compound, the addition time of the triethylborane compound, the type of the neodymium catalyst, and the addition order of the catalyst, as presented in Table 1.

increase in the amount of BEt$_3$ (in Examples 1 to 5). With the variation in the amount of BEt$_3$, the cold flow of high 1,4-cis polybutadiene was controlled maintaining the Mooney viscosity within 30 to 60, which range is characteristic to high 1,4-cis polybutadiene (in Examples 1 to 10). The effect in the control of cold flow was increased with an increase in the Mooney viscosity of high 1,4-cis polybutadiene (in Examples 3, 5 and 7). With the same amount of the catalyst, the addition order of the catalyst and the type of the neodymium catalyst had no significance on the effect in the control of cold flow (in Examples 2, 8, 9 and 10).

EXAMPLES 11 TO 17

The procedures were performed in the same manner as described in Example 1, excepting for the addition time of

TABLE 1

| Div. | Addition order of catalyst[1] | mol ratio | Cold flow (mg/min) | Mooney viscosity | 1,4-cis contents (%) | Yield (%) | BEt$_3$[2] addition time(min.) |
|---|---|---|---|---|---|---|---|
| Example 1 | Al(i-Bu)$_3$/ | 35:5:2:1:10 | 2.09 | 32.5 | 97.2 | 100 | 30 |
| Example 2 | Al(i-Bu)$_2$H/ | 35:5:2:1:20 | 1.08 | 36.5 | 97.0 | 100 | 30 |
| Example 3 | Al(i-Bu)$_2$Cl/ | 35:5:2:1:30 | 0.75 | 48.5 | 96.9 | 100 | 30 |
| Example 4 | Nd(VA)(vers)$_3$/ | 35:5:2:1:40 | 0.62 | 42.5 | 96.8 | 100 | 30 |
| Example 5 | BEt$_3$ | 35:5:2:1:50 | 0.39 | 47.0 | 96.7 | 100 | 30 |
| Example 6 | Al(i-Bu)$_3$/ | 35:5:2:1:1 | 2.61 | 40.0 | 97.5 | 100 | 60 |
| Example 7 | Al(i-Bu)$_2$H/ Al(i-Bu)$_2$Cl/ Nd(vers)$_3$/ BEt$_3$ | 35:5:2:1:5 | 0.63 | 55.2 | 97.5 | 100 | 60 |
| Example 8 | Nd(vers)$_3$/ Al(i-Bu)$_3$/ Al(i-Bu)$_2$H/ Al(i-Bu)$_2$Cl/ BEt$_3$ | 1:35:5:2:20 | 1.02 | 37.5 | 97.0 | 100 | 30 |
| Example 9 | Al(i-Bu)$_2$H/ Al(i-Bu)$_3$/ Al(i-Bu)$_2$Cl/ Nd(vers)$_3$/ BEt$_3$ | 5:35:2:1:20 | 1.04 | 37.0 | 97.2 | 100 | 30 |
| Example 10 | Al(i-Bu)$_2$Cl/ Al(i-Bu)$_3$/ Al(i-Bu)$_2$H/ Nd(vers)$_3$/ BEt$_3$ | 2:35:5:1:20 | 1.08 | 37.0 | 97.2 | 100 | 30 |

Note:
[1]In the polymerization catalyst, Al(i-Bu)$_3$: triisobutylaluminum, Al(i-Bu)$_2$H: diisobutylaluminum hydride Al(i-Bu)$_2$Cl: diisobutylaluminum chloride, Nd(VA)(vers)$_3$: Nd(versatic acid)(versatate)$_3$, BEt$_3$: triethylborane, Nd(vers)$_3$: Nd(versatate)$_3$; the catalyst of the Examples 1 to 5 is prepared in the presence of 1,3-butadiene and the catalyst of the Examples 6 to 10 is prepared without 1,3-butadiene.
[2]BEt$_3$ addition time is the time after the start of the polymerization.

As can be seen from the results of Table 1, the cold flow of high 1,4-cis polybutadiene was decreased with an triethylborane, the type of neodymium catalyst, and the addition order of the catalyst, as presented in Table 2.

TABLE 2

| Div. | Addition order of catalyst[1] | mol ratio | Cold flow (mg/min) | Mooney viscosity | 1,4-cis contents (%) | Yield (%) | BEt$_3$[2] addition time(min.) |
|---|---|---|---|---|---|---|---|
| Example 11 | Al(i-Bu)$_3$/ Al(i-Bu)$_2$H/ | 35:5:2:1:20 | 0.74 | 33.0 | 97.0 | 100 | 20 |
| Example | Al(i-Bu)$_2$Cl/ | 35:5:2:1:20 | 0.95 | 43.0 | 97.5 | 100 | 60 |

TABLE 2-continued

| Div. | Addition order of catalyst[1] | mol ratio | Cold flow (mg/min) | Mooney viscosity | 1,4-cis contents (%) | Yield (%) | $BEt_3$[2] addition time(min.) |
|---|---|---|---|---|---|---|---|
| Example 12 | Nd(VA)(vers)$_3$/ BEt$_3$ | 35:5:2:1:20 | 1.20 | 41.0 | 97.8 | 100 | 90 |
| Example 13 | | 35:5:2:1:20 | 1.30 | 44.0 | 97.7 | 100 | 120 |
| Example 14 | | 35:5:2:1:20 | 1.27 | 50.0 | 97.6 | 100 | 150 |
| Example 15 | | | | | | | |
| Example 16 | Nd(vers)$_3$/ Al(i-Bu)$_2$Cl/ Al(i-Bu)$_2$H/ Al(i-Bu)$_3$/ BEt$_3$ | 1:2:5:35:20 | 1.00 | 43.0 | 97.5 | 100 | 60 |
| Example 17 | Al(i-Bu)$_2$H/ Al(i-Bu)$_3$/ Al(i-Bu)$_2$Cl/ Nd(vers)$_3$/ BEt$_3$ | 5:35:2:1:20 | 0.97 | 43.5 | 97.8 | 100 | 60 |

Note:
[1]In the polymerization catalyst, Al(i-Bu)$_3$: triisobutylaluminum, Al(i-Bu)$_2$H: diisobutylaluminum hydride Al(i-Bu)$_2$Cl: diisobutylaluminum chloride, Nd(VA)(vers)$_3$: Nd(versatic acid)(versatate)$_3$, BEt$_3$: triethylborane, Nd(vers)$_3$: Nd(versatate)$_3$; the catalyst of the Examples 11 to 15 is prepared in the presence of 1,3-butadiene and the catalyst of the Examples 16 to 17 is prepared without 1,3-butadiene.
[2]BEt$_3$ addition time is the time after the start of the polymerization.

As can be seen from the results of Table 2, the effect in the control of cold flow was influenced with the variation in the addition time of BEt$_3$ compound. The polymerization, in which BEt$_3$ was added within 30 minutes after the start of the polymerization, provided better result in the control of cold flow than that, in which BEt$_3$ was added after 30 minutes following the start of the polymerization (in Examples 11 to 15). With the same amount of the catalyst used, both the addition order of the catalyst and the type of the neodymium catalyst had no significance on the effect in the control of cold flow (in Examples 12, 16 and 17).

EXAMPLES 18 TO 22

The procedures were performed in the same manner as described in Example 1, excepting that tributylborane was used as a cold flow controller instead of triethylborane, as presented in Table 3.

TABLE 3

| Div. | Addition order of catalyst[1] | mol ratio | Cold flow (mg/min) | Mooney viscosity | 1,4-cis contents (%) | Yield (%) | $BBu_3$[2] addition time (min.) |
|---|---|---|---|---|---|---|---|
| Example 18 | Al(i-Bu)$_3$/ Al(i-Bu)$_2$H/ Al(i-Bu)$_2$Cl/ Nd(VA)(vers)$_3$/ BBu$_3$ | 35:5:2:1:10 | 2.89 | 47.6 | 98.0 | 100 | 60 |
| Example 19 | | 35:5:2:1:20 | 2.50 | 37.7 | 97.9 | 100 | 60 |
| Example 20 | | 35:5:2:1:30 | 2.48 | 48.2 | 98.0 | 100 | 60 |
| Example 21 | | 35:5:2:1:40 | 1.96 | 50.7 | 97.7 | 100 | 60 |
| Example 22 | | 35:5:2:1:50 | 1.42 | 50.9 | 97.8 | 100 | 60 |

Note:
[1]In the polymerization catalyst, Al(i-Bu)$_3$: triisobutylaluminum, Al(i-Bu)$_2$H: diisobutylaluminum hydride Al(i-Bu)$_2$Cl: diisobutylaluminum chloride, Nd(VA)(vers)$_3$: Nd(versatic acid)(versatate)$_3$, BBu$_3$: tributylborane, Nd(vers)$_3$: Nd(versatate)$_3$; the catalyst of the Examples 18 to 22 is prepared in the presence of 1,3-butadiene.
[2]BBu$_3$ addition time is the time after the start of the polymerization.

As can be seen from the results of Table 3, the cold flow of high 1,4-cis polybutadiene was decreased with an increase in the amount of BBu$_3$ (in Examples 18 to 22). With the variation in the amount of BBu$_3$, the cold flow of high 1,4-cis polybutadiene was controlled maintaining the Mooney viscosity within 30 to 60, which range is characteristic to high 1,4-cis polybutadiene.

EXAMPLES 23 TO 26

The procedures were performed in the same manner as described in Example 1, excepting that B-methoxy-9-BBN (BM-9-BBN) was used as a cold flow controller instead of triethylborane, as presented in Table 4.

TABLE 4

| Div. | Addition order of catalyst[1] | mol ratio | Cold flow (mg/min) | Mooney viscosity | 1,4-cis contents (%) | Yield (%) | BM-9-BBN[2] addition time (min.) |
|---|---|---|---|---|---|---|---|
| Example 23 | Al(i-Bu)$_3$/ Al(i-Bu)$_2$H/ Al(i-Bu)$_2$Cl/ Nd(VA)(vers)$_3$/ BM-9-BBN | 35:5:2:1:20 | 2.58 | 30.1 | 97.6 | 100 | 60 |
| Example 24 | | 35:5:2:1:40 | 0.50 | 41.3 | 97.6 | 95.0 | 60 |
| Example 25 | | 35:5:2:1:60 | 0.74 | 30.0 | 97.7 | 96.7 | 60 |
| Example 26 | | 35:5:2:1:80 | 0.30 | 42.5 | 97.5 | 97.0 | 60 |

Note:
[1]In the polymerization catalyst, Al(i-Bu)$_3$: triisobutylaluminum, Al(i-Bu)$_2$H: diisobutylaluminum hydride Al(i-Bu)$_2$Cl: diisobutylaluminum chloride, Nd(VA)(vers)$_3$: Nd(versatic acid)(versatate)$_3$, BM-9-BBN: B-methoxy-9-BBN (wherein, BBN = borabicyclo[3.3.1]nonane); the catalyst of the Examples 23 to 26 is prepared in the presence of 1,3-butadiene.
[2]BM-9-BBN addition time is the time after the start of the polymerization.

COMPARATIVE EXAMPLES 1 TO 6

The procedures were performed in the same manner as described in Example 1, excepting that the polymerization was performed using Al(i-Bu)$_3$, BOEt$_3$, or Et$_2$BOMe as a cold flow controller instead of the organoborane compound of the present invention. The results are presented in Table 5.

the present invention as a cold flow controller (Tables 1 to 4). In Comparative Example 4, the cold flow was greatly reduced but the Mooney viscosity (molecular weight) of high 1,4-cis polybutadiene was greatly increased to cause a serious deterioration in the processability and the polymerization yield. In addition, when the cold flow of high 1,4-cis polybutadiene was controlled with other organoborane com-

TABLE 5

| Div. | Addition order of catalyst[1] | mol ratio | Cold flow (mg/min) | Mooney viscosity | 1,4-cis contents (%) | Yield (%) | Addition[2] time of boron compound (min.) |
|---|---|---|---|---|---|---|---|
| Comparative Example 1 | Al(i-Bu)$_3$/ Al(i-Bu)$_2$H/ Al(i-Bu)$_2$Cl/ Nd(VA)(vers)$_3$ | 50:5:2:1 | 12.51 | 13.8 | 96.7 | 95.7 | — |
| Comparative Example 2 | | 40:5:2:1 | 8.28 | 21.1 | 97.2 | 98.3 | — |
| Comparative Example 3 | | 35:5:2:1 | 7.75 | 30.5 | 97.8 | 100 | — |
| Comparative Example 4 | | 20:5:2:1 | 0.1 | 101.2 | 98.9 | 80.0 | — |
| Comparative Example 5 | Nd(vers)$_3$/ Al(i-Bu)$_2$Cl/ Al(i-Bu)$_2$H/ Al(i-Bu)$_3$/ BOEt$_3$ | 1:2:5:35:40 | 4.27 | 35.2 | 97.6 | 92.7 | After 60 min of polymerization |
| Comparative Example 6 | Nd(vers)$_3$/ Al(i-Bu)$_2$Cl/ Al(i-Bu)$_2$H/ Al(i-Bu)$_3$/ Et$_2$BOMe | 1:2:5:35:20 | 3.84 | 40.1 | 97.9 | 91.7 | After 60 min of polymerization |

Note:
[1]In the polymerization catalyst, Al(i-Bu)$_3$: triisobutylaluminum, Al(i-Bu)$_2$H: diisobutylaluminum hydride Al(i-Bu)$_2$Cl: diisobutylaluminum chloride, Nd(VA)(vers)$_3$: Nd(versatic acid)(versatate)$_3$, BOEt$_3$: triethyl borate Et$_2$BOMe: diethylmethoxyborane; the catalyst of the Comparative Examples 1 to 4 is prepared in the presence of 1,3-butadiene, and the catalyst of the Comparative Examples 5 to 6 is prepared without 1,3-butadiene.
[2]Boron compound addition time is the time after the start of the polymerization.

As can be seen from the results of Table 5, the cold flow of high 1,4-cis polybutadiene could be controlled using Al(i-Bu)$_3$ as a cold flow controller. The use of a smaller amount of Al(i-Bu)$_3$ provided 1,4-cis polybutadiene having a smaller cold flow (in Comparative Examples 1, 2 and 3). However, the absolute value of cold flow was much greater than those obtained using the organoborane compounds of pounds such as BOEt$_3$ and Et$_2$BOMe, the effect in the control of cold flow was significantly deteriorated (in Comparative Examples 5 and 6).

It is therefore apparent that the effect in the control of cold flow is clearly limited when using Al(i-Bu)$_3$ or other organoborane compounds than the organoborane compound of the present invention.

As described above, the present invention provides a method for preparing a high 1,4-cis polybutadiene having a 1,4-cis content of at least 95%, which method involves initiating polymerization of a 1,3-butadiene in the presence of a non-polar solvent using, as a polymerization catalyst, a complex prepared by mixing a neodymium compound with or without a conjugated diene compound, a halogenated organoaluminum compound or a halogenated organic compound, and an organoaluminum compound irrespective of the addition order of the catalyst; and adding an organoborane compound represented by the formula 1 or 2 as a cold flow controller of 1,4-cis polybutadiene after a predetermined time of the polymerization. Accordingly, a high 1,4-cis polybutadiene having a controlled cold flow can be prepared without causing a significant increase in the Mooney viscosity (molecular weight), an odor (bad smell), and a reduction in 1,4-cis content and polymerization yield, thereby solving the problems in regard to storability, workability and processability.

What is claimed is:

1. A method for preparing a high 1,4-cis polybutadiene having a 1,4-cis content of at least 95%, the method comprising:

initiating polymerization of a 1,3-butadiene in the presence of a non-polar solvent using a polymerization catalyst prepared by mixing irrespective of the addition order (1) a neodymium compound with or without a conjugated diene compound, (2) a halogenated organoaluminum compound or a halogenated organic compound, and (3) an organoaluminum compound; and adding an organoborane compound represented by following formula 1 or 2 as a cold flow controller of 1,4-cis polybutadiene after a predetermined time of the polymerization:

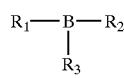

Formula 1 wherein $R_1$, $R_2$ and $R_3$ are the same or different and include an alkyl group having 1 to 5 carbon atoms, respectively,

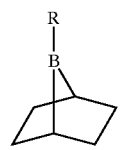

Formula 2 wherein R is an alkoxy or alkyl group having 1 to 5 carbon atoms.

2. The method as claimed in claim 1, the organoborane compound represented by the formula 1 includes at least one selected from the group consisting of trimethylborane, triethylborane, tripropylborane, tributylborane, triisobutylborane, and tripentylborane.

3. The method as claimed in claim 1, the organoborane compound represented by the formula 2 includes at least one selected from the group consisting of B-methoxy-9-BBN, B-ethoxy-9-BBN, B-propanoxy-9-BBN, B-butanoxy-9-BBN, B-isobutanoxy-9-BBN, B-pentoxy-9-BBN, B-methyl-9-BBN, B-ethyl-9-BBN, B-propyl-9-BBN, B-butyl-9-BBN, B-isobutyl-9-BBN, and B-pentyl-9-BBN.

4. The method as claimed in claim 1, the neodymium compound and the organoborane compound are mixed at a mol ratio of 1:1 to 1:80.

5. The method as claimed in claim 1, the predetermined time is at most three hours right after the start of the polymerization.

6. The method as claimed in claim 1, the neodymium compound includes at least one selected from the group consisting of neodymium(hexanoate)$_3$, neodymium(heptanoate)$_3$, neodymium(octanoate)$_3$, neodymium(2-ethyl hexanoate)$_3$, neodymium(naphthenate)$_3$, neodymium(versatate)$_3$, neodymium(stearate)$_3$, and neodymium(versatic acid)(versatate)$_3$.

7. The method as claimed in claim 1, the halogenated organoaluminum compound includes at least one selected from the group consisting of compounds represented by the formula $AlX_nR^4_{3-n}$, wherein n is 1 to 2; X is Cl or Br; and $R^4$ is the same or different and includes an alkyl group having 1 to 10 carbon atoms.

8. The method as claimed in claim 1, the halogenated organoaluminum compound includes at least one selected from the group consisting of dimethylaluminum chloride, diethylaluminum chloride, dipropylaluminum chloride, dibutylaluminum chloride, and diisobutylaluminum chloride.

9. The method as claimed in claim 7, the halogenated organoaluminum compound includes at least one selected from the group consisting of dimethylaluminum chloride, diethylaluminum chloride, dipropylaluminum chloride, dibutylaluminum chloride, and diisobutylaluminum chloride.

10. The method as claimed in claim 1, the halogenated organic compound includes at least one selected from tert-alkyl halogen, organoboron halogen, organosilyl halogen, and organotitanium halogen compounds.

11. The method as claimed in claim 1, the halogenated organic compound includes tert-butyl chloride.

12. The method as claimed in claim 10, the halogenated organic compound includes tert-butyl chloride.

13. The method as claimed in claim 1, the organoaluminum compound includes at least one selected from the group consisting of trimethylaluminum, triethylaluminum, tripropylaluminum, tributylaluminum, triisobutylaluminum, trihexylaluminum, trioctylaluminum, and diisobutylaluminum hydride.

14. The method as claimed in claim 1, the non-polar solvent includes at least one selected from butane, pentane, hexane, isopentane, heptane, octane, isooctane, cyclopentane, methylcyclopentane, cyclohexane, methylcyclohexane, ethylcyclohexane, benzene, toluene, ethylbenzene, and xylene.

* * * * *